United States Patent [19]
Häfner

[11] Patent Number: 5,497,669
[45] Date of Patent: Mar. 12, 1996

[54] FORCE MEASURING DEVICE

[75] Inventor: Hans W. Häfner,
Aichach-Walchshofen, Germany

[73] Assignee: Pfister Messtechnik GmbH, Germany

[21] Appl. No.: 53,895

[22] Filed: Apr. 27, 1993

[30] Foreign Application Priority Data

Apr. 30, 1992 [DE] Germany .................. 42 14 291.1

[51] Int. Cl.⁶ .................................................. G01L 5/00
[52] U.S. Cl. .................... 73/862.636; 73/862.57
[58] Field of Search .............. 73/862.636, 862.621, 73/862.041, 862.042, 862.043, 862.57, 862.642

[56] References Cited

U.S. PATENT DOCUMENTS

| | | | |
|---|---|---|---|
| 3,313,151 | 4/1967 | Kaye | 73/862.629 |
| 3,410,135 | 11/1968 | Reynaud | 73/862.636 |
| 4,754,653 | 7/1988 | Häfner et al. | 73/862.68 |
| 4,770,050 | 9/1988 | Hafner et al. | 73/862.636 |
| 4,827,240 | 5/1989 | Hafner | 73/862.636 |
| 4,864,874 | 9/1989 | Häfner | 73/862.38 |
| 4,896,543 | 1/1990 | Gullman | 73/862.041 |
| 5,036,714 | 8/1991 | Christoffers et al. | 73/862.636 |
| 5,060,965 | 10/1991 | Haefner et al. | 280/504 |
| 5,149,121 | 9/1992 | Häfner | 280/432 |

*Primary Examiner*—Richard Chilcot
*Assistant Examiner*—Ronald L. Biegel
*Attorney, Agent, or Firm*—Gerald E. Linden

[57] ABSTRACT

Force measuring device including a rigid, piston-type inner element (2) and a rigid, cylindrical outer element (4) having an interior conture complementary to the peripheral surfaces of the inner element (2); a narrow annular gap (3, 3a, 3b) between surfaces of the inner and outer elements facing each other; elastomeric, essential bubblefree material (5) provided in annular gap (3, 3a, 3b) and fixedly adhering to the contact surfaces; a ring space (6) formed between the inner and outer elements (2, 4) and filled with the elastomeric material (5) as well; and at least one pressure sensor (9) being in pressure transmission contact to the elastomeric material (5) in ring space (6), characterized in that the pressure sensor (9) is arranged eccentrically in respect of the central axis (10) and is designed for detecting both axial force components (A) and radial force components (B) acting at a force introduction position (11) and thereby forming a moment rotational pole (M) on the central axis (10).

18 Claims, 2 Drawing Sheets

FORCE MEASURING DEVICE

TECHNICAL FIELD OF THE INVENTION

The invention relates to force measuring devices and, more particularly, to force measuring devices including a rigid, piston-type inner element; a rigid, cylindrical outer element having an interior contour complementary to the peripheral surfaces of the inner element; a narrow annular gap between surfaces of the inner and outer elements facing each other; an elastomeric, essentially bubble-free material provided in said annular gap and fixedly adhering to said contact surfaces; a ring space formed between said inner and outer elements and filled with said elastomeric material as well; and at least one pressure sensor being in pressure transmission contact to said elastomeric material in said ring space.

BACKGROUND OF THE INVENTION

EP 0 205 509 C1 (U.S. Pat. No. 4,574,653) discloses a force measuring device comprising a pot-type outer element and a piston element inserted therein by forming a narrow annular gap with the narrow annular gap and a cylindrical space formed between the inner end face of the piston element and the bottom of the pot-type outer element being filled with elastomeric material fixedly adhering to the contact surfaces and being essentially bubblefree. A pressure sensor is inserted into the bottom wall of the outer element and is in pressure transmitting contact to the elastomeric material. Thus, only forces in axial direction of the annular gap, i.e. in general supporting forces are detected.

EP 0 302 437 A2 (U.S. Pat. No. 4,864,874) discloses a force measuring device which is, for example, used in connection with a trailer coupling and has a design according to the principle of the force measuring device described above. However, no pot-type outer element is used but a cylindrical outer element and an inner element matching it and being provided with a passage. The narrow annular gap is subdivided by a cylindrical annular space in first and second annular gap regions having different annular diameters each, which annular space is formed as a transition step and is filled with elastomeric material as well. At least one pressure sensor may be embedded in the elastomeric material in the annular space. Opposing radial surfaces of the inner and outer elements form stops which narrowly limit a relative movement between the inner and outer elements in pulling direction. For measuring in the one and in the opposite directions two such force measuring devices are oppositely arranged. With such a design measurement, in only the axial direction is possible, i.e. as a pulling or pushing force. For measuring a radially directed force, i.e. a supporting force in vertical direction, a separate force measuring device is required.

Furthermore, EP 0 428 890 A2, (U.S. Pat. No. 5,060,965) in particular FIG. 8, discloses a force measuring device for detecting forces acting at an angle to each other, in particular normal to each other, where the device comprises at least two force measuring elements acting normally to each other and having a design according to the first-mentioned publication. Accordingly, there must be provided two pot-type outer elements and inner elements fitted therein, as well as a pressure sensor for each. This results in a relatively expensive manufacture of a force measuring device arranged at a common support element. Furthermore, in this publication the possibility has been disclosed to measure moments acting onto the trailer coupling, with a force measuring cell being arranged at a predetermined distance in respect of the pulling ear for measuring moments caused upon braking or by lateral forces. However, in view of the required distance from the pulling ear this design is relatively space-consuming.

SUMMARY OF THE INVENTION

Accordingly, it is the object of the invention to improve such a force measuring device in respect of simple design and compactness.

This object is solved by a force measuring device comprising the features of patent claim 1.

According to the invention, there is provided a force measuring device including a rigid, piston-type inner element and a rigid, cylindrical outer element having an interior contour complementary to the peripheral surfaces of the inner element; a narrow annular gap between surfaces of the inner and outer elements facing each other; an elastomeric, essentially bubble-free material provided in said annular gap and fixedly adhering to said contact surfaces; a ring space formed between said inner and outer elements and filled with said elastomeric material as well; and at least a pressure sensor being in pressure transmission contact to said elastomeric material in said ring space, characterized in that said pressure sensor is arranged eccentrically in respect of a central axis of said inner and outer elements and is provided for detecting both axial force components (A) and radial force components (B) acting at a force introduction position, wherein gap width of said annular gap and hardness of said elastomeric material are selected such that upon loading said force introduction position with said radial force component (B) a moment pivot axis (M) is formed along said central axis.

With a design such as is suggested it is of particular advantage that with just a single pressure sensor both axial forces and force components acting at an angle thereto may be measured in view of the effect of a moment superimposed to the axial force. No extra distances are required for arranging the force measuring cell, nor other transmission mechanisms; rather, the axial length existing at the inner or outer elements is used for implementing the lever necessary for moment measurement and is, therefore, the radial force component. In this connection, use is made of the fact that even with a rather narrow annular gap and an exact guidance in the elastomeric material upon a radially or laterally directed loading of a force measuring cell designed for axial loading the inner element may minimally tilt or pivot with respect to the outer element about a moment pivot axis located on the center axis. Such a tilting is transmitted via the radially expanded steps of the inner and outer elements in a type of an angular lever to the eccentrically arranged pressure sensor. Thus, for example when using the force measuring device with a trailer coupling with the trailer at rest, the support load may be detected by means of the moment acting onto the inner element, whilst then in movement the pushing forces, for example when moving downward or the like, may be measured and may be used for anti-skid control or the like.

For simultaneously detecting the axial and radial forces during movement preferably two diametrically arranged pressure sensors are provided such that the measuring values thereof may be added for detecting the axial force whilst by substraction of their measuring values a proportional signal is formed for the acting radial force component, since by the minimal twist of the inner element relative to the outer element about a moment pivot axis on the center axis the one pressure sensor is unloaded whilst the other is additionally loaded by the moment proportional to the radial force component. Thus, an exact separation between the axial and radial force components is possible for the measurement.

Further advantageous modifications are subject of the subclaims. Hereinafter three embodiments are explained and described in more detail.

DETAILED DESCRIPTION OF THE INVENTION

Figure 1:
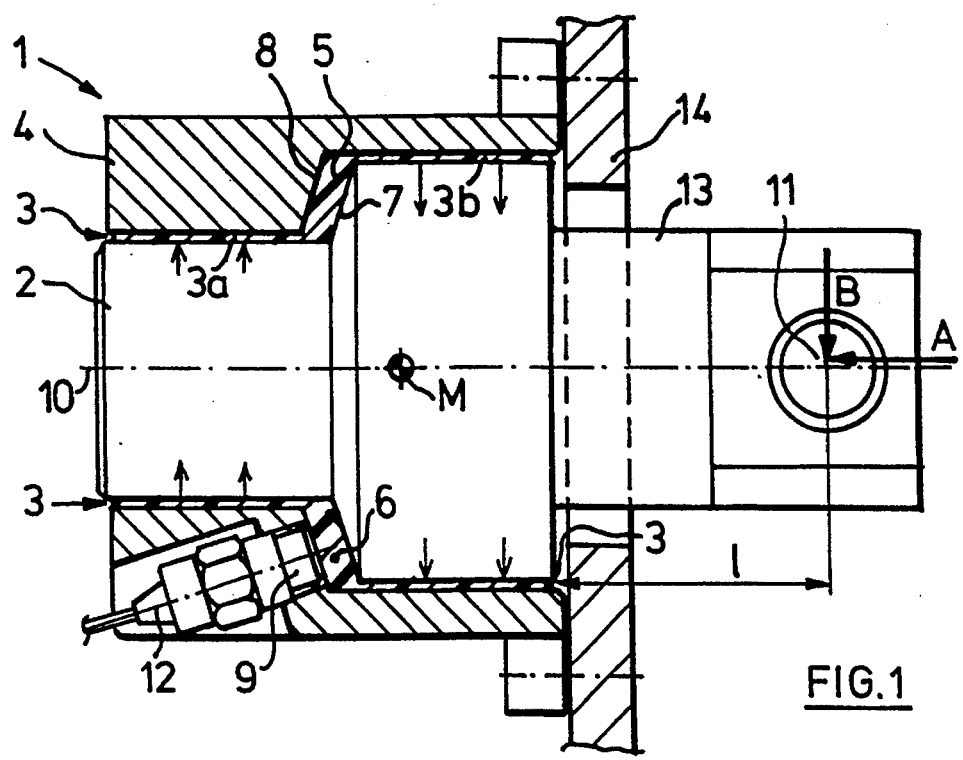
FIG. 1 is a sectional view of a force measuring device including a pressure sensor in exemplary use as a trailer coupling.

FIG. 1 illustrates as a longitudinal sectional view of a force measuring device 1 comprising, in principle, a rigid piston-type inner element 2 and a rigid cylindrical outer element 4, in a narrow annular gap 3 therebetween being filled-in elastomeric material 5. The elastomeric material 5, for example silicone or rubber, preferably is bubblefree and is, for example by vulcanization applied, fixedly adhering to the peripheral and inner surfaces, respectively, of the inner and outer elements 2, 4 facing each other. Preferably, annular gap 3 is subdivided into two ring gap regions 3a and 3b having different diameters such that at the transition between the annular gap regions 3a and 3b a ring space 6 is formed which is filled with the elastomeric material 5 as well. The ring space 6 is further confined by inclined steps 7 and 8 at the inner element 2 and the outer element 4, respectively. At step 8 associated to the outer element 4 an eccentrically arranged plug-like pressure sensor 9 is screwed in with its end face facing the elastomeric material 5 being in pressure transmission contact therewith. Steps 7 and 8 of the inner and outer elements 2, 4 are aligned at an angle of about 70° to 75° in respect of the central axis 10, with the end face of the pressure sensor 9 being approximately parallel to step 8.

The inner element 2 is extended at the right-hand side and forms at its right end a force introduction position 11 at which the axial force components A and the radial force components B act. By this lever-like extension of the inner element 2 a projection 13 is formed, with the force introduction position 11 formed at its outer end being located at a distance of one lever length l from the right end face of the outer element 4 and, therefore, from the annular gap 3. Preferably, the alignment of pressure sensor 9 and lever length l are selected such that the axis 12 of the pressure sensor 9 is directed to the force introduction position 11.

Now, with a radial force component B acting onto the force introduction position 11, projection 13 and the inner element 2 connected thereto, is slightly pressed downward, as far as permitted by the guidance of the inner element 2 by the elastomeric material 5. Thus, the annular gap region 3b having the larger diameter is pressed together in its lower half whilst the upper half of the annular gap region 3b is slightly unloaded, as far as permitted by the hardness of the elastomeric material 5. These movements are in the region of thousandth or hundredth millimeters. This minimum tilting or pivoting movement results in a slight twisting of the inner element 2 relative to the outer element 4 such that a rotational pole or a moment pivot axis M is formed in the center of the region of the inner element 2 having the larger diameter. By this loading movement and the minimum twisting about the moment axis M the annular gap region 3a having the smaller diameter is unloaded and loaded, respectively, as compared with the initial condition. In this situation the loading is opposite as compared with the annual gap region 3b, as indicated by the short arrows. In view of this slight twisting or tilting of the inner element 2 relative to the outer element 4 the lower region of the ring space 6 is heavier loaded than the upper region such that in view of the pressure transmission by the elastomeric material 5 an increased loading is transmitted to the pressure sensor 9 which is proportional to the radially acting force component B. This increased pressure loading in the lower region of ring space 6 causes increased measuring values at the pressure sensor 9 which values are converted into electric signals in well-known manner, for instance by means of strain gauges or piezoresistive resistors provided on a diaphragm and are then further passed on to an evaluating apparatus.

It should be noted that with this embodiment with a single pressure sensor 9 in usual manner as disclosed in the publications discussed at the beginning, in addition to the axial force component A the radial force component B may be detected. Thus, there is realized a force measuring device 1 which, in addition to axially directed forces, detects force components deviating from the axial direction by means of moments caused by forces acting at an angle thereto, in particular radial forces and, therefore, by tiltings between the inner and outer elements to each other.

Figure 2:
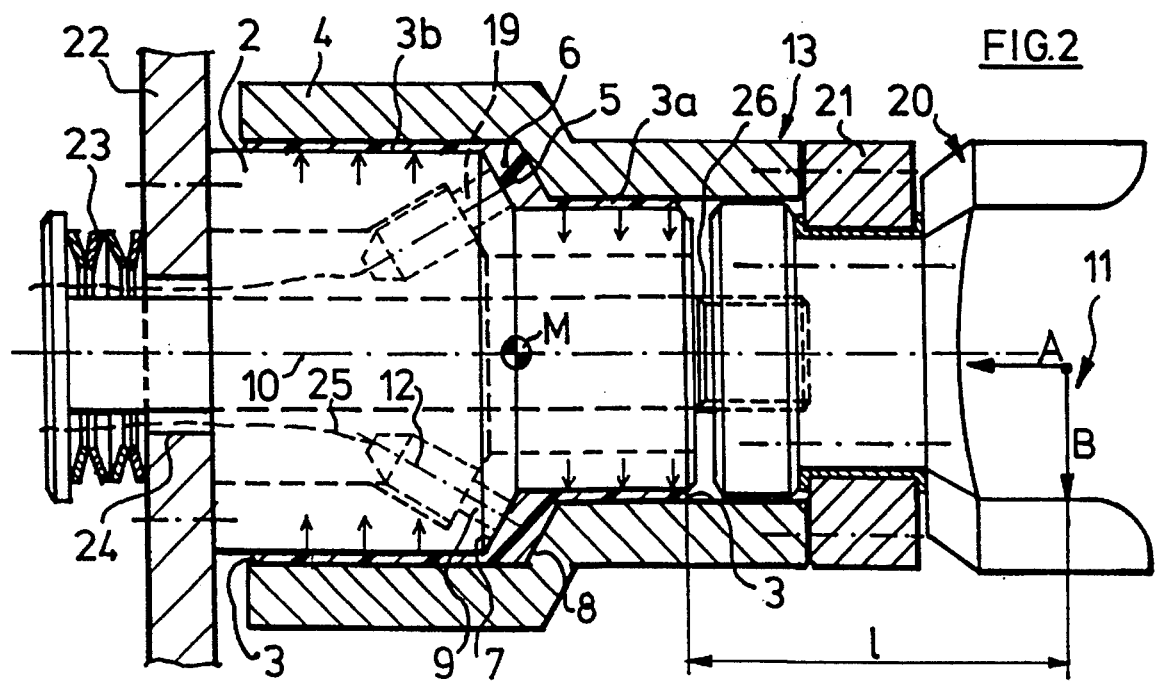
FIG. 2 is a modified force measuring device including two pressure sensors.

FIG. 2 shows a modified embodiment of the force measuring device, with the inner and outer elements 2, 4 being arranged essentially the other way around, with two pressure sensors 9, 19 being arranged in the inner element 2 whilst the projection 13 has the lever length l and the force introduction position 11 is provided at the outer element 4. This results, with an essentially similar length, in an increase of the effective lever arm l such that a higher measuring accuracy may be achieved in respect of the radial component. Furthermore, there are provided the two pressure sensors 9, 19 being offset in a cross-sectional plane in respect of the central axis 10 by 180°, i. e. they are arranged in the plane of the drawing. This arrangement has the advantage that the axial forces A and the radial forces B, in this connection the vertically acting support forces onto an exemplarily illustrated trailer coupling 20 may be separately evaluated even with simultaneous occurrence of the components. For example, if a pushing force acts onto the trailer coupling 20, the two pressure sensors 9, 19 are symmetrically loaded such that an addition of their measuring values results in a value proportional to the pushing force. However, the pressure sensors 9, 19 may be selected such that each measures independent from the other, with the two measuring values being compared with each other or being averaged.

Now, with a force component B deviating from the axial direction, here for example a vertically acting support load, by tilting the outer element 4 relative to the inner element 2 rigidly provided at a frame 22 the one pressure sensor 9 is additionally loaded whilst the other pressure sensor 19 is correspondingly unloaded. The subtraction of the two values results in a measure for the amount of the vertical force.

A flange 21 is provided at the right-hand end of outer element 4, which flange grasps behind the coupling recess of trailer coupling 20 and permits a rotational movement of the coupling recess. Washer springs 23 are provided at the left-hand end of trailer coupling 20 toward the inner element 2, which springs bias the inner element 2 relative to the outer element 4, as disclosed in EP-0 437 284 A2. At the left-hand end of inner element 2, screw connections are indicated by dash-dot lines, by means of which the trailer coupling 20 may be attached via the inner element 2 to the vehicle frame 22. This frame part 22 is provided with a central bore 24 through which, as illustrated by dashed lines, the signal cable 25 of the pressure sensors 9, 19 may be passed out of the interior of the hollow inner element 2. The rest of the design with respect to the elastomeric material 5, the annular gap 3 and the ring space 6 corresponds to that of FIG. 1 with the same reference numerals used. Furthermore, in the interior of the inner element 2 a traction anchor 26 is provided in connection with the coupling recess and transmitting the bias of the washer springs 23. Simultaneously, this traction anchor 26 serves as an overload protection upon engagement of the washer springs 23 in order to prevent, at extreme loadings, the outer element 4 from being stripped off of the inner element and damaging the elastomeric material 5. This is true for FIG. 1 as well, where a frame portion 14 prevents the tearing-out of the inner elemnt 2 but permits sufficient moving space for the (minimum) axial and radial movements due to the forces A and B.

Figure 3:
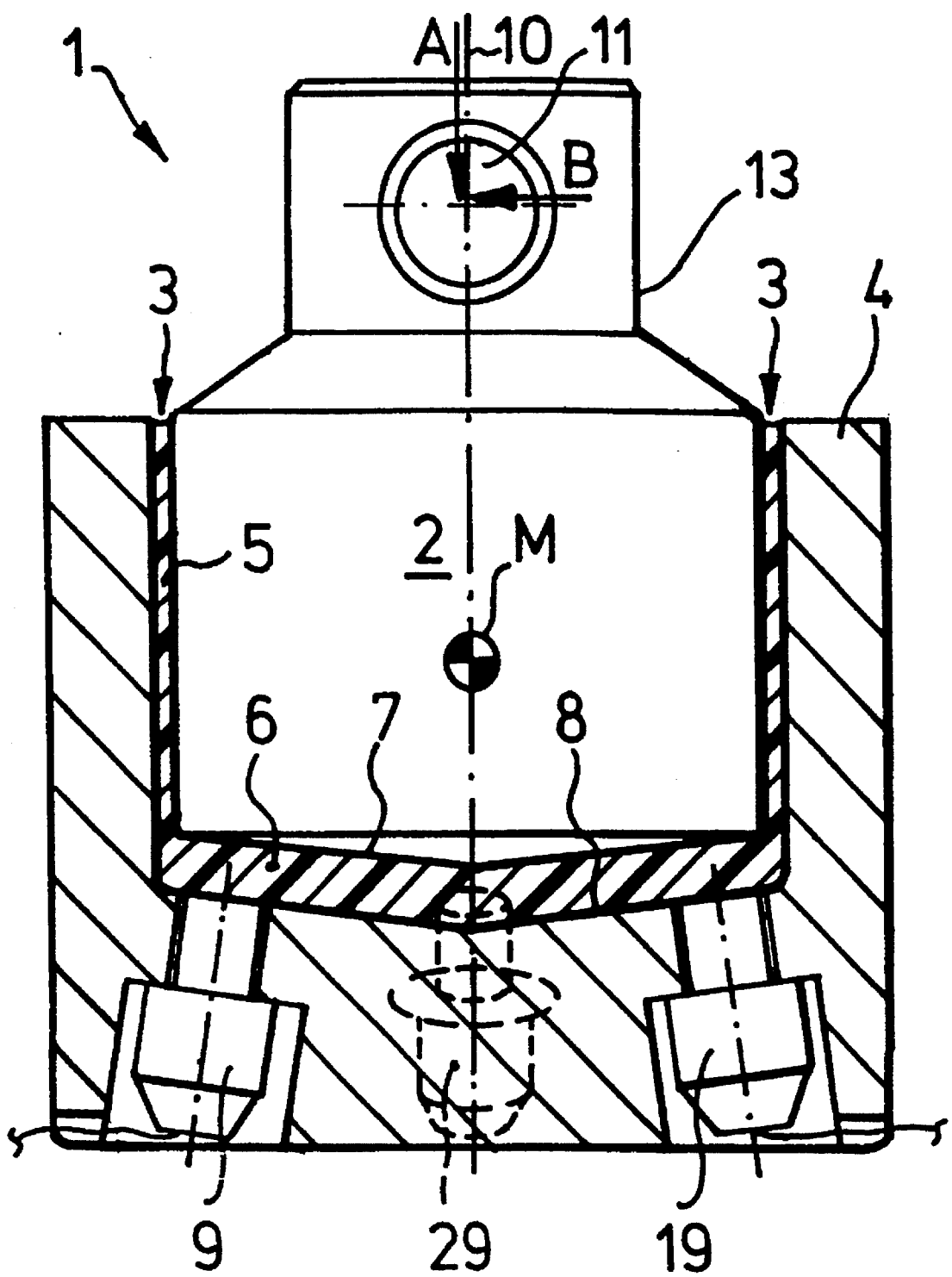
FIG. 3 is a modified force measuring device including three pressure sensors.

FIG. 3 shows a further embodiment of the force measuring device 1, with three pressure sensors 9, 19, and 29 being arranged at the pot-type outer element 4. All three pressure sensors 9, 19, and 29 are in pressure transmission contact with the elastomeric material 5 which fills both the ring space 6 at the bottom side of the piston-like inner element 2 and the narrow annular gap 3. The pressure sensors 9 and 19 detect, as with the embodiment of FIG. 2, (minimum) tilting or pivoting movements of the inner element 2 due to the force exertion of the radial force component B, with the inner element 2 having the tendency to pivot or tilt, respectively, about the moment pivot axis M in a movement direction in the drawing plane. In addition, the pressure sensor 29 is offset by 90° with respect to the pressure sensors 9 and 19 such that a force and moment measurement, respectively, is possible as well with a radial force component B being not exactly directed in the drawing plane. In this situation the moment axis M would not extend exactly normal to the drawing plane, but would be slightly inclined as well with respect to it or would be even formed as a three-dimensional rotational pole.

Thus, with such an arrangement of the pressure sensors a three-dimensional detection of acting force components is possible. In addition to the radial force detection by moment measurement about the moment pivot axis or the moment rotational pole M, respectively, by adding the measuring values of the three pressure sensors 9, 19, and 29 the axial force may be measured as well. It should be noted that in addition to the pressure sensors around the periphery of the ring space 6 a centrally arranged pressure sensor may be provided as with the prior art which, however, is able to detect the axial force A only. Furthermore, as explained in connection with FIG. 1, for each dimension X-Y-Z only one pressure sensor each may be provided about the periphery of the ring space 6, i. e. pressure sensor 9 illustrated on the left-hand side may, for example, be omitted. In contrast to the illustrated arrangement of the three pressure sensors 9, 19, 29 at angular distances of 90°, 180°, and 270° the three pressure sensors may equidistantly be arranged about the periphery at angular distances of 120° each. However, it is essential that the pressure sensors are arranged remote from the central axis 10 such that the tilting movement of the inner element 2 depending on the direction of this tilting movement and, therefore, of the moment pivot axis M results in an additional loading or unloading at the corresponding pressure sensors.

As with the embodiments explained above, here the ring space 6 is confined by surfaces 7 and 8 extending inclined with respect to the central axis 10, and the pressure sensors 9, 19, and 29 are attached normal to these inclined surfaces such that the center axes of the pressure sensors 9, 19, and 29 approximately intersect at the force introduction position 11. The moment pivot axis M is situated in the lower third of the piston-type inner element 2 such that there is a considerable lever arm between the rotational pole M and the force introduction position 11 whilst the second lever arm of the inner element 2 acting as a type of angular lever is constituted as the distance of the pressure sensor from the central axis 10 said distance corresponding to the radius of the ring space 6. In order to provide lever ratios as large as possible the pressure sensors 9, 19, and 29 are located as remote as possible about the periphery of the ring space 6 whilst, on the other hand, the force introduction position 11 is as remote as possible from the moment pivot axis M. In this embodiment the distance between the moment pivot axis M and the position 11, thus forming said first lever arm, and the distance between the moment pivot axis M and the pressure sensor(s) 9 (19, 29), thus forming the second lever arm, are quite similar. Conveniently, projection 13 projects as much as possible to achieve a high transmission ratio for component B.

The gap width of the annular gap 3 and the hardness of the filled-in elastomeric material 5 are adapted to the order of magnitude of the acting radial force component. For example, if only small radial forces B are to be expected as compared with the axial force A, the gap width of the annular gap 3 may be relatively large and the (rubber) hardness of the elastomeric material 5 may be relatively low such that the inner element 2 is supported relatively flexible in respect to bending. This allows relatively large tilting movements in the regions of tenth to hundredth of millimeters such that there will occur correspondingly large responses at the pressure sensors 9, 19, and 29.

On the other hand, if very large radial force components B are to be expected, the gap width of the annular gap 3 will be selected relatively small and/or the (Shore) hardness of the elastomeric material 5 will be selected relatively large such that upon a tilting movement any engagement of the outer and inner elements at the upper end of the annular gap 3 is prevented. The selection of the gap width, for example in the region between 0.1 to 1 mm and a Shore hardness between 40 to 80 for matching the ratios of the force components are left to the skilled person in adapting to the pertinent purpose of the force measuring device its diameter, its length, and its maximum load.

Furthermore, the height of the annular gap 3 is of influence to the tiltability between the outer and inner elements as well. For example, if the depth of insertion of the inner element 2 into the outer element 4 and, therefore, the height of annular gap 3 is reduced, the moment axis M moves toward the force introduction position 11, thus relatively reducing the effective lever arm 1. In principle, for a sufficient measuring accuracy, in particular a small hysteresis and a simultaneously sufficient response sensitivity, the annular gap height may be in the order of the radius of the inner element 2.

What is claimed is:

1. A force measuring device, for measuring axially-directed forces and non-axially-directed tilting moments, comprising:

a rigid, piston-type inner element having a central axis and a peripheral surface, and having an external diameter;

a rigid, cylindrical outer element disposed coaxially about the inner element and having an interior surface complementary to and facing the peripheral surface of the inner element, and having an internal diameter;

an annular, axially-aligned gap between the peripheral surface of the inner element and the interior surface of the outer element, said gap having a gap width, said gap width being small as compared with the external diameter of the inner element and the internal diameter of the outer element;

a non-axially aligned ring space formed along the gap, between the peripheral surface of the inner element and the interior surface of the outer element;

an elastomeric, essentially bubble-free material, completely filling said annular gap and said ring space;

at least one pressure sensor, radially offset from the central axis and being in pressure transmission contact to said elastomeric material in said ring space;

wherein:

a one of the inner or outer elements is adapted in use to be fixed to a frame, an other of the inner or outer elements being movable with respect to the frame;

said at least one pressure sensor is disposed remote from the central axis and at an angle thereto for detecting both axially-directed force components and non-axially-directed force components acting upon the force measuring device at a force introduction position;

when the movable element is acted upon by the non-axially-directed force component, a moment pivot axis is formed along and intersecting said central axis in response to said non-axially-directed moments;

the elastomeric material is adhered to the peripheral surface of the inner element and to the interior surface of the outer element, continuously along the gap and the ring space; and each of said at least one pressure sensors is inserted into the outer element, with an end face of said pressure sensor being in pressure transmission contact to said elastomeric material in said ring space.

2. Force measuring device, according to claim 1, wherein:

said inner element has a first portion of a first diameter and a second portion of a second diameter different from the first diameter, and a first inclined step disposed between the first and second portions of the inner element;

said outer element has a first portion of a third diameter and a second portion of a fourth diameter different from the third diameter, and a second inclined step disposed between the first and second portions of the outer element;

said narrow annular gap is subdivided in first and second annular gap regions, said first annular gap region disposed between the first portions of the inner and outer elements, said second annular gap region disposed between the second portions of the inner and outer elements; and said ring space is disposed between the first and second inclined steps.

3. Force measuring device, according to claim 1, wherein:

each of said at least one pressure sensors extends from an inner surface of said inner element to the peripheral surface of said inner element, and projects through said first inclined step to said ring space.

4. Force measuring device, according to claim 1, wherein:

each of said at least one pressure sensors is disposed through said outer element and projects through said second inclined step to said ring space.

5. Force measuring device, according to claim 1, wherein:

said first and second inclined steps are parallel to one another and are oriented at an angle to the central axis of said inner and outer elements and that said at least one pressure sensor is aligned normal to said steps.

6. Force measuring device, according to claim 5, wherein:

said first and second inclined steps are aligned at an angle of about 70°–75° with respect to the central axis.

7. Force measuring device, according to claim 1, further comprising:

a projection having a length is provided at an end of the inner element and projecting axially beyond the annular gap;

wherein:

the moment acting at the force introduction position is calculated in consideration of the lever length and the distances of the pressure sensors from the central axis.

8. Force measuring device, according to claim 1, further comprising:

a projection provided at an end of the outer element and projecting axially beyond the annular gap by a lever length;

wherein:

the non-axially-directed moments acting at the force introduction position are determined by the lever length and the radially offsets of the pressure sensors from the central axis.

9. Force measuring device, according to claim 1, further comprising:

a projection provided at an end of the outer element and projecting axially beyond the annular gap by a lever length;

wherein:

the non-axially-directed moments acting at the force introduction position are determined by the lever length and the radial offsets of the pressure sensors from the central axis.

10. A force measuring device, for measuring axially-directed forces and non-axially-directed tilting moments, comprising:

a rigid, piston-type inner element having a central axis and a peripheral surface, and having an external diameter;

a rigid, cylindrical outer element disposed coaxially about the inner element and having an interior surface complementary to and facing the peripheral surface of the inner element, and having an internal diameter;

an annular, axially-aligned gap between the peripheral surface of the inner element and the interior surface of the outer element, said gap having a gap width, said gap width being small as compared with the external diameter of the inner element and the internal diameter of the outer element;

a non-axially aligned ring space formed along the gap, between the peripheral surface of the inner element and the interior surface of the outer element;

an elastomeric, essentially bubble-free material, completely filling said annular gap and said ring space;

at least one pressure sensor, radially offset from the central axis and being in pressure transmission contact to said elastomeric material in said ring space;

wherein:

a one of the inner or outer elements is adapted in use to be fixed to a frame, an other of the inner or outer elements being movable with respect to the frame;

said at least one pressure sensor is disposed remote from the central axis and at an angle thereto for detecting both axially-directed force components and non-axially-directed force components acting upon the force measuring device at a force introduction position;

when the movable element is acted upon by the non-axially-directed force component, a moment pivot axis is formed along and intersecting said central axis in response to said non-axially-directed moments;

the elastomeric material is adhered to the peripheral surface of the inner element and to the interior surface of the outer element, continuously along the gap and the ring space; and each of said at least one pressure sensors is inserted into the inner element, with an end face of said pressure sensor being in pressure transmission contact to said elastomeric material in said ring space.

11. Force measuring device, according to claim 10, wherein:

said inner element has a first portion of a first diameter and a second portion of a second diameter different from the first diameter, and a first inclined step disposed between the first and second portions of the inner element;

said outer element has a first portion of a third diameter and a second portion of a fourth diameter different from the third diameter, and a second inclined step disposed between the first and second portions of the outer element;

said narrow annular gap is subdivided in first and second annular gap regions, said first annular gap region disposed between the first portions of the inner and outer elements, said second annular gap region disposed between the second portions of the inner and outer elements; and said ring space is disposed between the first and second inclined steps.

12. Force measuring device, according to claim 10, wherein:

each of said at least one pressure sensors extends from an inner surface of said inner element to the peripheral surface of said inner element, and projects through said first inclined step to said ring space.

13. Force measuring device, according to claim 10, wherein:

each of said at least one pressure sensors is disposed through said outer element and projects through said second inclined step to said ring space.

14. Force measuring device, according to claim 10, wherein:

said first and second inclined steps are parallel to one another and are oriented at an angle to the central axis of said inner and outer elements and that said at least one pressure sensor is aligned normal to said steps.

15. Force measuring device, according to claim 14, wherein:

said first and second inclined steps are aligned at an angle of about 70°–75° with respect to the central axis.

16. Force measuring device, according to claim 10, further comprising:

a projection having a length is provided at an end of the inner element and projecting axially beyond the annular gap;

wherein:

the moment acting at the force introduction position is calculated in consideration of the lever length and the distances of the pressure sensors from the central axis.

17. A force measuring device, for measuring axially-directed forces and non-axially-directed tilting moments, comprising:

a rigid, piston-type inner element having a central axis and a peripheral surface, and having an external diameter;

a rigid, cylindrical outer element disposed coaxially about the inner element and having an interior surface complementary to and facing the peripheral surface of the inner element, and having an internal diameter;

an annular, axially-aligned gap between the peripheral surface of the inner element and the interior surface of the outer element, said gap having a gap width, said gap width being small as compared with the external diameter of the inner element and the internal diameter of the outer element;

a non-axially aligned ring space formed along the gap, between the peripheral surface of the inner element and the interior surface of the outer element;

an elastomeric, essentially bubble-free material, completely filling said annular gap and said ring space;

at least one pressure sensor, radially offset from the central axis and being in pressure transmission contact to said elastomeric material in said ring space;

wherein:

a one of the inner or outer elements is adapted in use to be fixed to a frame, an other of the inner or outer elements being movable with respect to the frame;

said at least one pressure sensor is disposed remote from the central axis and at an angle thereto for detecting both axially-directed force components and non-axially-directed force components acting upon the force measuring device at a force introduction position;

when the movable element is acted upon by the non-axially-directed force component, a moment pivot axis is formed along and intersecting said central axis in response to said non-axially-directed moments;

the elastomeric material is adhered to the peripheral surface of the inner element and to the interior surface of the outer element, continuously along the gap and the ring space; and three pressure sensors are provided, distributed along a periphery of the ring space.

18. Force measuring device, according to claim 17, wherein:

the three pressure sensors are provided, distributed at equal angular positions with respect to the central axis.

* * * * *